United States Patent [19]

Tanaka

[11] Patent Number: 5,065,007
[45] Date of Patent: Nov. 12, 1991

[54] APPARATUS FOR MEASURING LIGHT OUTPUT FROM SEMICONDUCTOR LIGHT EMITTING ELEMENT

[75] Inventor: Toshiaki Tanaka, Yokohama, Japan

[73] Assignee: Kabushiki Kaisha Toshiba, Kawasaki, Japan

[21] Appl. No.: 571,158

[22] Filed: Aug. 23, 1990

[30] Foreign Application Priority Data

Aug. 31, 1989 [JP] Japan ................................ 1-222957

[51] Int. Cl.$^5$ ............................................ H01J 40/14
[52] U.S. Cl. ................................. 250/215; 324/158 D
[58] Field of Search ........................... 250/211 R, 215; 324/158 D; 356/218, 221

[56] References Cited

U.S. PATENT DOCUMENTS 4,859,939  8/1989  Gittleman et al. .............. 324/158 D
5,008,617  4/1991  Czubatyj et al. ................ 324/158 D Primary Examiner—David C. Nelms
Assistant Examiner—Khaled Shami
Attorney, Agent, or Firm—Finnegan, Henderson, Farabow, Garrett, and Dunner

[57] ABSTRACT

A first ohmic electrode of a light emitting diode is put into contact with an electrode plate, and a second ohmic electrode of the same is put into contact with a mesh electrode formed by a metal net. The mesh electrode is mounted on a light receiving surface of the light receiving element. When a predetermined amount of current is supplied from a power source to the mesh electrode and electrode plate, light is emitted from that portion of the light emitting diode located around the second ohmic electrode, and the light passes through the spaces of the mesh electrode, then being received by the light receiving element. The light receiving element supplies an electric signal indicative of the light to a measuring circuit, whereby the output of the light emitting diode is measured.

11 Claims, 3 Drawing Sheets

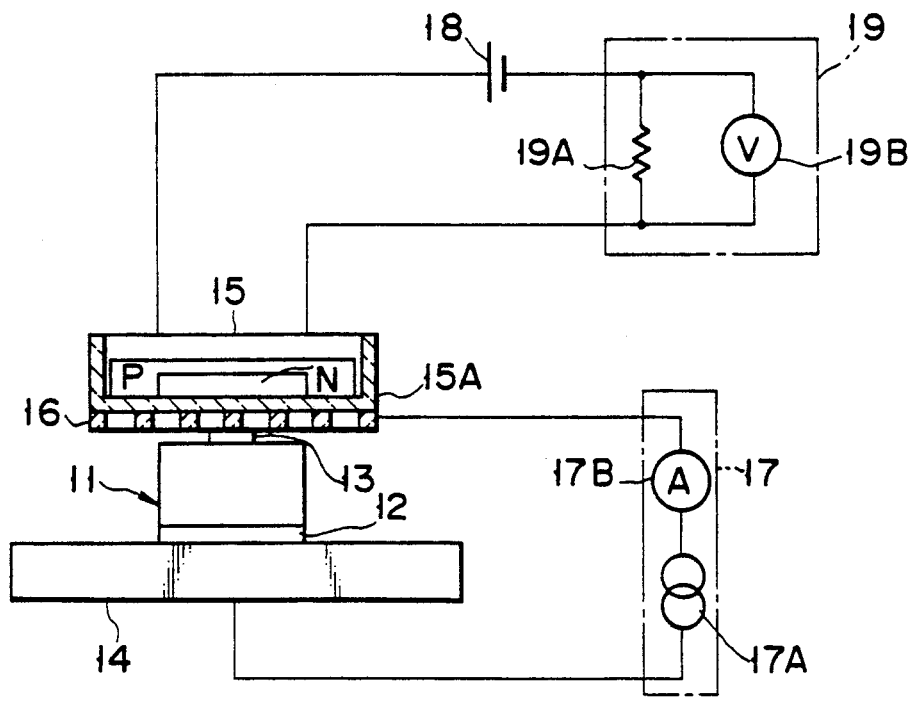
F I G. 3
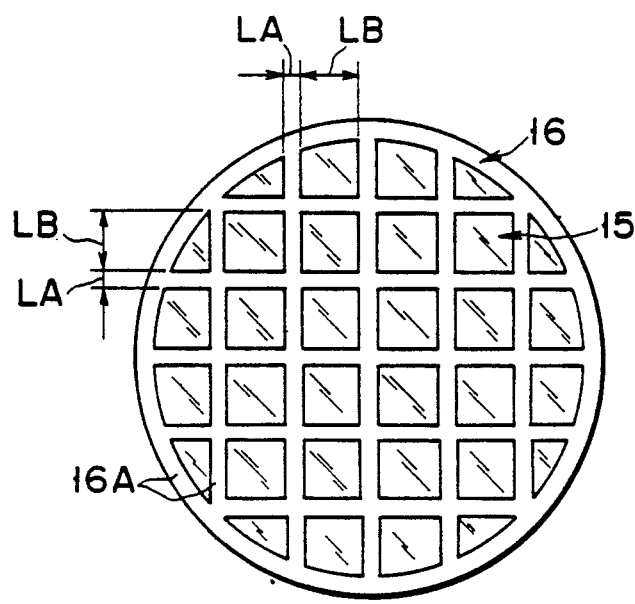
F I G. 4

APPARATUS FOR MEASURING LIGHT OUTPUT FROM SEMICONDUCTOR LIGHT EMITTING ELEMENT

BACKGROUND OF THE INVENTION

1. Field of the Invention

This invention relates to an improved apparatus for measuring the light emitted from a semiconductor light emitting element such as a light emitting diode.

2. Description of the Related Art

In general, the outputs of semiconductor light emitting elements, such as light emitting diodes, are measured after the elements are manufactured in the form of pellets, thereby to reject the pellets whose outputs are insufficient, or to classify the pellets in accordance with their outputs measured.

FIG. 1 shows a conventional light-measuring apparatus. In the figure, a light emitting element 1, such as a light emitting diode, is provided with an ohmic electrode 2, 4, the ohmic electrode 2 contacts a flat electrode plate 3 incorporated in the apparatus, and another ohmic electrode 4 of the element 1 contacts a probe 5 incorporated in the same. The apparatus has a power source 6 comprising a current source circuit 6A and an ammeter 6B, and interposed between the electrode plate 3 and probe 5, for supplying a predetermined amount of electric current to the light emitting element 1.

A light receiving element 7, such as a photodiode, having a diameter of 10-20 mm is located above the light emitting element 1, for converting the light emitted from the element 1 into an electric signal. The output of the element 7 is measured by a voltmeter 8A, which constitutes a measuring circuit 8 together with a resistor 8B.

FIG. 2 shows another conventional light-measuring apparatus, which is different from the above-described apparatus only in that a transparent electrode layer 9 is used in place of the probe 5. More specifically, the light receiving element 7 has a transparent insulating package 7A. The transparent and conductive electrode layer 9 made of, for example, stannic oxide is formed on the package 7A. The layer 9 is connected to the power source 6. When the layer 9 contacts the ohmic electrode 4 of the light emitting element 1 as is shown in the figure, the element 1 emits light. The light receiving element 7 converts the light into an electric signal, which is measured by the measuring circuit 8.

Referring back to FIG. 1, if the light emitting element 1 has a width of about 0.3 mm, the distance between the elements 1 and 7 must be set to not less than 10 mm, so as to provide a sufficient space for the probe 5. Accordingly, the light receiving element 7, having a small light receiving surface, can receive only a small part of the light emitted from the element 1, which makes it difficult to accurately detect the light output from the element 1.

In the apparatus shown in FIG. 2, the light receiving surface of the element 7 is close to the light emitting element 1, improving the measuring accuracy. However, the electrode layer 9 has sheet resistance ρs of about 100 Ω/□, which is lower than that of any metal. Hence, this apparatus is disadvantageous in that the output of the light emitting element 1 may be varied by the heat the electrode layer 9 generates from the electric power supplied thereto.

The apparatus shown in FIG. 2 is also disadvantageous in another respect. When this apparatus measures the forward-direction voltage characteristic of the light emitting element 1, the measurement may be affected by the voltage drop across the electrode layer 9 due to low conductivity thereof.

SUMMARY OF THE INVENTION

It is the object of the present invention is to provide a light measuring apparatus capable of measuring the light output from a semiconductor light emitting element with accuracy.

To attain the above object, the applicant's apparatus for measuring outputs from a semiconductor light emitting element, having first and second electrodes, for emitting light from that portion thereof located in the vicinity of the second electrode, comprises:

a third electrode to be brought into contact with the first electrode of the semiconductor light emitting element;

a light receiving element for receiving the light emitted from the semiconductor light emitting element, and outputting an electric signal indicative of the light;

a fourth electrode formed by a metal net and provided on a light receiving surface of the light receiving element, the fourth electrode being to be brought into contact with the second electrode of the semiconductor light emitting element, for supplying electric current to the semiconductor light emitting element, together with the third electrode; and means for measuring the output of the semiconductor light emitting element, from the corresponding electric signal output by the light receiving element.

Thus, the light receiving element employed in the invention has its light receiving surface provided with the fourth electrode formed by a metal net, and the light emitting element is supplied with electric power by way of the fourth electrode, whereby light is emitted from the light emitting element to the light receiving element through spaces formed in the fourth electrode. Accordingly, the light receiving surface is sufficiently close to the light emitting element, and overheat of the light emitting element can be prevented to thereby make it possible to measure the light output with accuracy.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a schematic diagram showing a light measuring apparatus according to an embodiment of the present invention;

FIG. 4 is a plan view showing a mesh electrode employed in the apparatus of FIG. 3;

DETAILED DESCRIPTION OF THE PREFERRED EMBODIMENT

Figure 1:
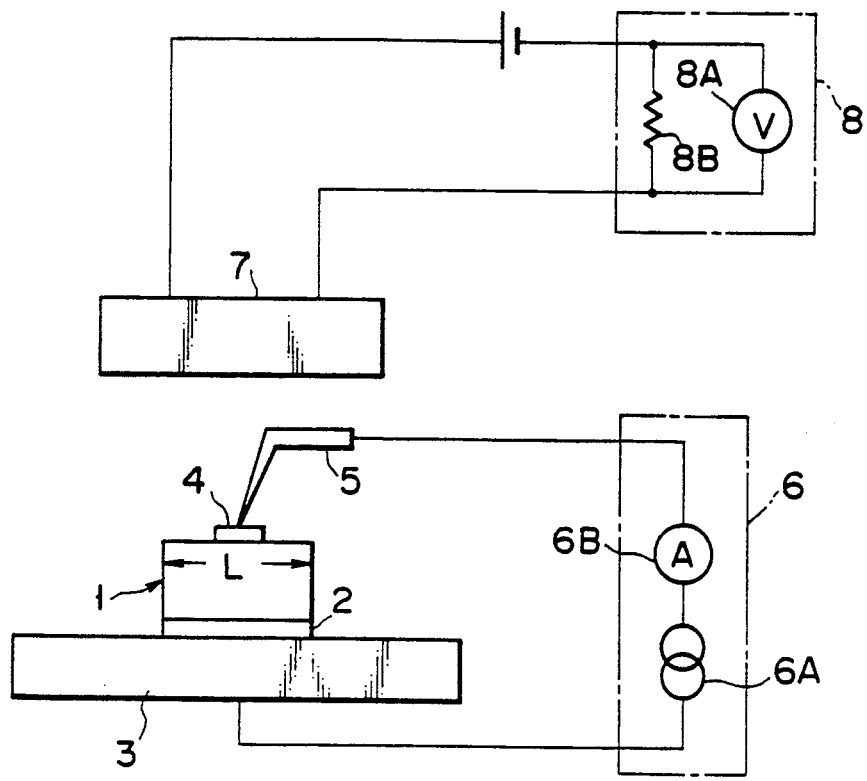
FIG. 1 is a diagram showing a conventional light measuring apparatus.
Figure 2:
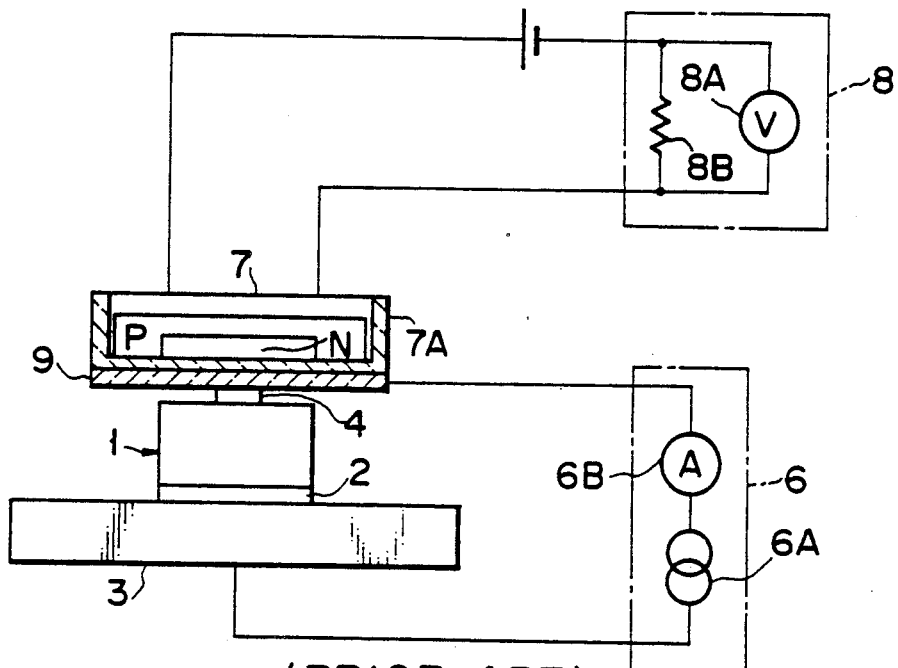
FIG. 2 is a schematic diagram showing another conventional light measuring apparatus.

The present invention will now be described in detail with reference to the accompanying drawings showing an embodiment thereof.

Referring first to FIG. 3, a light emitting element 11, such as a light emitting diode, is provided with first and second ohmic electrodes 12 and 13. The first ohmic electrode 12 is brought into contact with a flat electrode plate 14 formed of a metal and having, for example, gold plated thereon.

A light receiving element 15, such as a photo diode, has a light receiving surface provided with a mesh electrode 16 to be brought into contact with the second ohmic electrode 13. As is shown in FIGS. 3 and 4, the mesh electrode 16 is formed by depositing gold (Au) 16A on the surface of a package 15A of the receiving element 15, which is made of a transparent insulator such as glass. The electrode 16 can also be formed by weaving stainless filaments 16B in the form of a net, and the net is attached to the package 15A, as is shown in FIG. 5.

Figure 5:
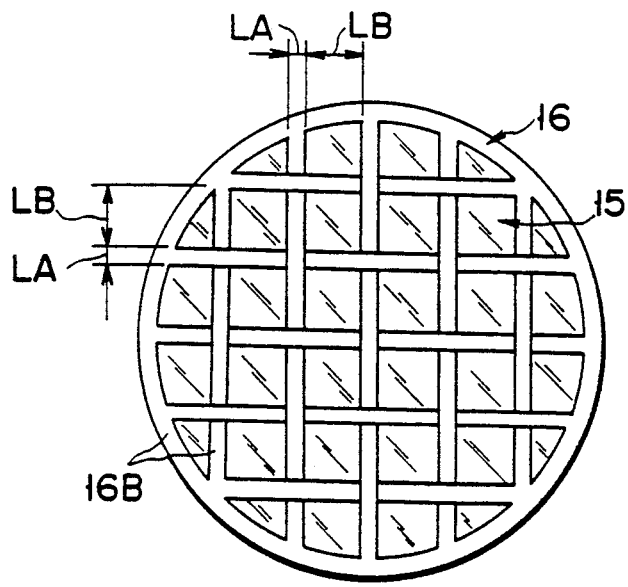
FIG. 5 is a plan view showing another example of an electrode.
Figure 6:
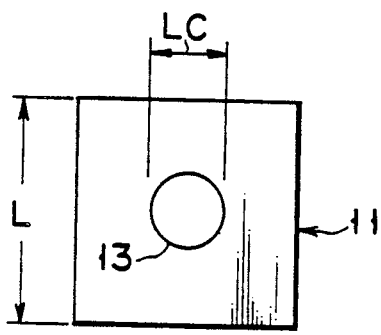
FIG. 6 is a plan view showing a light emitting element employed in the apparatus of FIG. 3.

Thus, the electrode 16 consists of a plurality of elements, each of which has a width LA of 30 μm, and the distance LB between each two of which is 90 μm, as is shown in FIGS. 4 and 5. Further, as is shown in FIG. 6, the second ohmic electrode 13 of the light emitting element 11 has a diameter LC of 100 μm. Thus, the mesh electrode 16 can always contact the second ohmic electrode 13, whichever portion of the former is placed on the latter.

The condition for contacting the mesh electrode 16 with the second ohmic electrode 13 is:

$$LA < LC$$

The condition for making the mesh electrode 16 cover less than 50% of the area of the receiving element 15 is:

$$\{LA / (LA + LB)\}^2 \geq 0.5$$

Thus, that area of the element 15 to be covered with the mesh electrode 16 can be set from 50% to 20%. The second ohmic electrode 13 is not necessarily shaped circle.

Returning to FIG. 3, a power source 17, including a power source circuit 17A and an ammeter 17B, is interposed between the electrode 16 and electrode plate 14. When the power source 17 is turned on, with the electrode 16 being connected to the second ohmic electrode 13, electric current flows through the elements 16, 13, 11, 12, and 14, whereby light is emitted from that portion of the light emitting element 11 located around the second ohmic electrode 13, to the light receiving element 15 through the gaps defined between the elements of the electrode 16. The light receiving element 15 converts the light into an electric signal. A measuring circuit 19 is connected to the element 15 through a power source 18. The circuit 19 comprises a resistor 19A and a voltmeter 19B, to which resistor the output of the light receiving element 15 is applied. The voltmeter 19B detects the voltage drop across the resistor 19A, to thereby detect the light emitted from the light emitting element 11.

In the above embodiment, the light emitting element 11 is opposed to the light receiving element 15, with the mesh electrode 16 interposed between the elements 11 and 15. Hence, the distance between the elements 11 and 15 can be set to a few mm. Further, the mesh electrode 16 interrupts only 50-20% of the light emitted from the light emitting element 11. This structure restrains the light interruption amount smaller than in conventional apparatuses. Thus, the applicant's apparatus can measure the light output more accurately.

Moreover, the mesh electrode 16 is made of gold or stainless, and therefore has an electrical conductivity higher than the conventional transparent conductive electrode layer 9, which prevents the electrode 16 from generating as much heat as causing a change in the light output from the light emitting element 11.

Furthermore, the electrical conductivity of the electrode 16 is so high that the voltage drop across the same can be ignored, which enhances the accuracy of the measurement of the forward-direction voltage characteristic of the light emitting element 11, and hence enables a measurement apparatus of high versatility to be manufactured.

The distance LB between each two electrode elements is set smaller than the diameter of the second ohmic electrode 13 of the light emitting element 11, which enables the electrode 16 to be surely put into contact with the electrode 13.

In addition, when any portion of the electrode 16 touches the second ohmic electrode 13, the resistance value of the electrode 16 is not varied by virtue of the high conductivity of the electrode 16, which also makes it possible to perform an accurate measurement.

This invention is not limited to the measurement of the output of a light emitting diode, but can be applied to the measurement of the output of, for example, a semiconductor laser which emits light from the front surface thereof.

Further, this invention can be modified in various manners without departing from the spirit and scope thereof.

What is claimed is:

1. An apparatus for measuring outputs from a semiconductor light emitting element, having first and second electrodes, for emitting light from that portion thereof located in the vicinity of the second electrode, the apparatus comprising:

a third electrode to be brought into contact with the first electrode of the semiconductor light emitting element;

a light receiving element for receiving the light emitted from the semiconductor light emitting element, and outputting an electric signal indicative of the light;

a fourth electrode formed by a metal net and provided on a light receiving surface of the light receiving element, the fourth electrode being to be brought into contact with the second electrode of the semiconductor light emitting element, for supplying electric current to the semiconductor light emitting element, together with the third electrode; and means for measuring the output of the semiconductor light emitting element, from the corresponding electric signal output by the light receiving element.

2. An apparatus according to claim 1, wherein the fourth electrode comprises a plurality of elements, the distance between each two of the elements being set slightly smaller than the diameter of the second electrode of the semiconductor light emitting element.

3. An apparatus according to claim 1, wherein the fourth electrode is formed by weaving stainless filaments in the form of a net.

4. An apparatus according to claim 1, wherein the fourth electrode is formed by depositing gold on the light receiving surface of the light receiving element.

5. An apparatus according to claim 1, further comprising power supply means for supplying electric current to the third and fourth electrodes.

6. An electrode apparatus for supplying electric current to a semiconductor light emitting element having first and second electrodes, and for allowing a light receiving element to receive light emitted from that portion of the semiconductor light emitting element located in the vicinity of the second electrode, the apparatus comprising:
   a third electrode to be brought into contact with the first electrode of the semiconductor light emitting element; and
   a fourth electrode formed by a metal net and provided on a light receiving surface of the light receiving element, the fourth electrode being to be brought into contact with the second electrode of the semiconductor light emitting element, for supplying electric current to the semiconductor light emitting element, together with the third electrode.

7. An apparatus according to claim 6, wherein the fourth electrode comprises a plurality of elements, the distance between each two of the elements being set slightly smaller than the diameter of the second electrode of the semiconductor light emitting element.

8. An apparatus according to claim 6, wherein the fourth electrode is formed by weaving stainless filaments in the form of a net.

9. An apparatus according to claim 6, wherein the fourth electrode is formed by depositing gold on the light receiving surface of the light receiving element.

10. An apparatus according to claim 6, further comprising power supply means for supplying electric current to the third and fourth electrodes.

11. An apparatus according to claim 6, wherein the light receiving element outputs an electric signal indicative of the light emitted from the semiconductor light emitting element, and further comprising means for measuring the output of the semiconductor light emitting element, from the corresponding electric signal.

* * * * *